(No Model.)
H. F. D. SCHWAHN.
PROCESS OF REDUCING ALUMINIUM.
No. 562,785. Patented June 23, 1896.
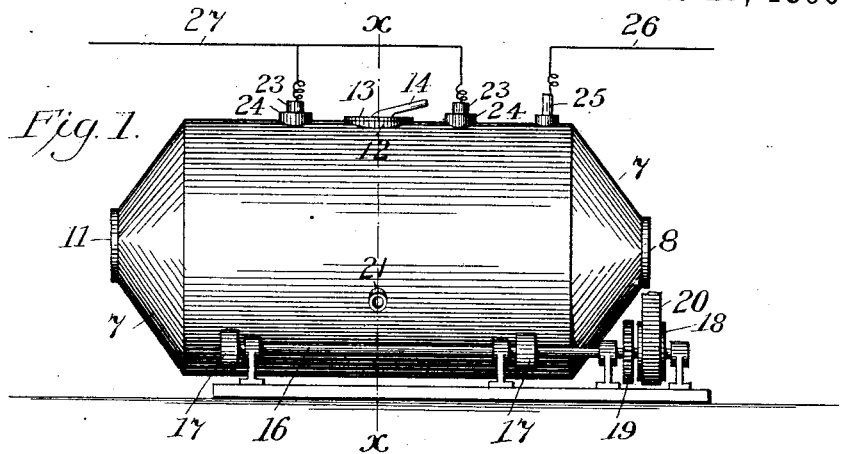
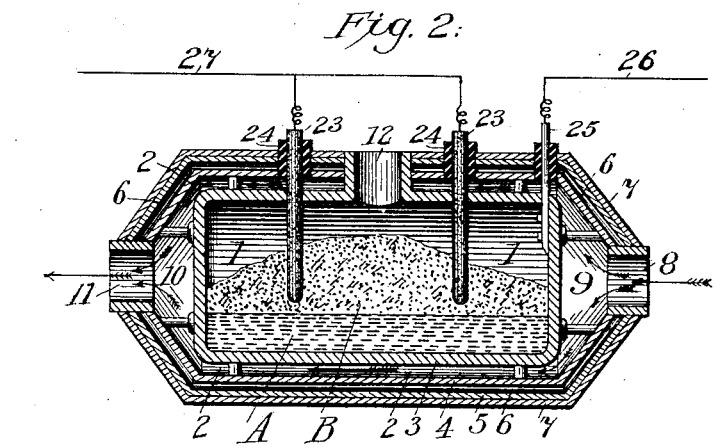
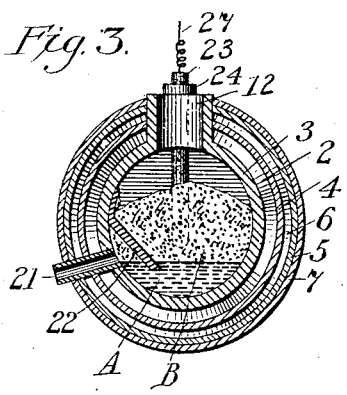
Witnesses.
Gustave Schwahn.
J. R. Young.
Inventor.
H. F. D. Schwahn.

UNITED STATES PATENT OFFICE.

HEINRICH F. D. SCHWAHN, OF KANSAS CITY, MISSOURI.

PROCESS OF REDUCING ALUMINIUM.

SPECIFICATION forming part of Letters Patent No. 562,785, dated June 23, 1896.

Application filed January 31, 1895. Serial No. 536,892. (No specimens.)

*To all whom it may concern:*

Be it known that I, HEINRICH F. D. SCHWAHN, a citizen of the United States, residing at Kansas City, in the county of Jackson and State of Missouri, have invented a certain new and useful Improved Process of Reducing Aluminium; and I do hereby declare that the following is a full, clear, and exact description, which will enable others skilled in the art to which it appertains to make and use the same.

My invention relates to methods for reducing aluminium directly from aluminous minerals and salts of aluminium.

My improved method of manufacturing aluminium consists in treating the ores and minerals containing alumina, preferably first, by my improvement in "Processes of purifying aluminous minerals," Letters Patent No. 514,039, dated February 6, 1894, and in mixing with the purified aluminous minerals a certain quantity of nitric, hydrochloric, and sulfuric acid, alkaline earths and salts of the alkaline-earth metals which are of such a character that the same do not undergo fusion if charged into a subliming furnace or retort, and heated to about white heat, a temperature higher than that at which sublimation of chlorid of aluminium occurs, and which do form with the impurities accompanying the alumina generally, such as silica and iron oxid, a porous mass, and I preferably employ for this purpose native sulfate of barium, carbonate of magnesia and lime or the double carbonate of lime and magnesia, hydrate and chlorid of lime, and chlorid of magnesia. In some aluminous ores or minerals the above-named alkaline earths are already present in sufficient quantities. In such cases it is not necessary to add the same, and I preferably employ such natural combinations. I also add a certain quantity of an alkali-metal salt, preferably such a one as chlorid of sodium as being the cheapest; but also the fluorid of sodium, preferably in form of the double fluorid of aluminium and sodium, (cryolite,) for reason of being an aluminous ore, having in its composition an alkali-metal salt, may be profitably employed. With the resultant mass I mix some carbonaceous matter, preferably such as sawdust or powdered carbon, for the freer evolving of the chlorid of aluminium produced by the chlorin set at liberty within the reaction carried in by the said sulfuric acid on the said nitric and hydrochloric acids or nitrohydrochloric acid and chlorid of sodium, &c. The said alkali metal acts by its base which is reduced first within the reduction as a reducing agent and flux. The above-named alkali-metal salts are carried within the said reaction into sulfates.

If not a very pure aluminium shall be produced, then I heat the resultant mass, consisting chiefly then of chlorid of aluminium and sulfates of aluminium, sodium, magnesium, calcium, &c., to glow, until all chlorids and sulfates are decomposed, and I especially do this in such cases if the aluminium in the certain aluminous mineral to be treated is accompanied only by a small per cent. of silica and iron. The evolved gases, consisting chiefly of the waste nitrohydrochloric and sulfuric acids resultant from the said treatment, I recover in a suitable receiver. The remaining mass I powder and mix the same with powdered carbon, preferably charcoal, in this way producing a bath, which I reduce by stocking the same into a suitable crucible composed of iron or steel, to which external heat is applied, and in passing an electric current through the said bath. For the manufacture of very pure aluminium, I stock the above mixture into a suitable roasting or subliming furnace and volatilize and recover the resultant chlorid of aluminium and alkali-metal salts into the previously-recovered waste acids, preferably within an absorbing apparatus forming the subject of another application for Letters Patent filed by me August 19, 1895, Serial No. 559,859. After expelling the said waste acids and decomposing of the chlorids and sulfates of the recovered mass, consisting then chiefly of chlorid of aluminium and sulfates of the alkali metals, I produce a bath by powdering the remaining mass, consisting then chiefly of alumina and alkali-metal oxids, and mixing the same with powdered carbon. The said bath I reduce as above by passing an electric current through the same and applying external heat to the containing vessel or retort, consisting also of a suitable metal such as iron or steel.

By the passage of the electric current through one or the other bath above described the carbon of the same maintains a uniform resistance to the current, is made incandescent, heating and electrifying the bath, generating carbon-oxid gas, thereby reducing the alumina with the assistance of the simultaneously-reduced alkali metals which act as reducing agents and fluxes. The reduction is assisted by the external applied heat and the resultant chemical action of the glowing iron or steel of the retort.

In the accompanying drawings, which are hereby made a part of this specification, is shown the apparatus for the reduction suitable for the practice of my invention. I do not, however, limit myself to the apparatus shown, since any other suitable apparatus would answer equally well for the practice of my invention. Into its containing vessel or retort, which by itself forms the positive electrode, I have suspended the necessary negative electrodes and both connected with wires.

Figure I represents a side elevation of the apparatus with the suspended electrodes. Fig. II represents a longitudinal vertical section of the same. Fig. III is a transverse section taken on line $x\,x$ of Fig. I.

Referring to the drawings, 1 represents a receptacle or retort surrounded by a series of auxiliary chambers or flues 2, to permit the passage of heat, said flues being located between the shell 3 of the retort and an annular shell 4; surrounding said retort.

5 represents an annular shell surrounding the shell 4, but having an intervening dead-air space 6 to prevent radiation. Around the shell 5 is another shell 7, preferably made of iron. The retort and shells surrounding the same are preferably made oblong in longitudinal section and round in cross-section.

8 represents an aperture leading through the outer shells into the space 9 for the passage of gases or heat, conducting the same to the flues 2, surrounding the retort, the heat-atoms passing through said flues as shown by arrows, passing into a space 10 at the opposite end of the receptacle and out through an aperture 11, connecting with a stack or flue. (Not shown.)

The retort 1 is provided with an opening 12 through which the same may be filled or stocked, and then may be closed partly or entirely by a suitable door, in order to retain most of the heat and inclose the atmospheric air, such, for instance, as the plate 13 with handle 14.

Within the reduction the receptacle may be set in any suitable position so as to have the charge-opening on top or more on the side.

The means of rotation are as follows: The receptacle is placed within a cradle formed of a base 15, supporting shafts 16, having rollers 17 thereon, said rollers supporting the receptacle. 18 represents a drive-pulley connected with one of the shafts 16 by a suitable gearing 19, in order to drive said shaft and turn said receptacle. 20 represents a drive-belt for driving the pulley 18. 21 represents a tap-hole located in the side of the receptacle, passing from the retort through the different shells in order that the metal after being reduced and the remaining slag may be tapped out at will, said tap-hole being suitably closed normally by means of clay. 22 represents a cover over the mouth of the tap-hole 21, within the retort, producing a semibell-chamber, so as to prevent passage of the contents between itself and the retort, except through the lower part of the same. The object of performing the operation in a vessel so sealed is to prevent the escape of the bath and permit of running off the metal as fast as it is reduced, the open mouth of the usual semibell-chamber being sealed by dipping into molten aluminium A, the pressure due to the height of the column of aluminium causing a difference of level of the same sufficient to raise the aluminium outside the semibell-chamber to the end of the tap-hole 21 into ingots. (Not shown.) 23 are anodes of carbon passing insulated through openings 24 into the furnace, as shown in the drawings and are immersed in the bath B to within a short distance of the subjacent aluminium A, which forms the cathode of the electrolytic decomposition cell or retort 1, with its electrical connection 25.

The retort 1 is set in fire-brick work, so that while the former vessel need to be made of material such as iron or steel in consequence of their chemical action and conductivity of electricity, the material of which the annular shells are made only need to possess the necessary strength and non-conductivity for electricity. 26 and 27 are the wires connecting the positive and negative electrodes with a suitable source for electricity. (Not shown.)

In carrying out my improved method on a commercial scale, I have adopted a certain mode of operation and formula and I preferably employ only the reduction in the apparatus with the combined use of fire and electricity, and I proceed as follows: I mix the purified and ground aluminous mineral with nitric acid and hydrochloric acid sufficiently to moisten the pulp, and said acids I apply, preferably, in the ratio of one part of nitric acid to two parts of hydrochloric acid. To cheapen the manufacture of the aluminium, I profitably employ the waste nitrohydrochloric acid for this purpose and also produce to renew the utilized nitric and hydrochloric acids, the said acids within the process, by mixing the crude material therefor, namely, chlorid of sodium and nitrate of sodium or potassium, with the aluminous mineral, thereby also introducing the necessary alkali-metal salts, which I add about equal in quantity to the alumina present in the aluminous mineral employed, and decompose with about ten per cent. of sulfuric acid, preferably such known as "chamber" acid, as usual. Then I add, if not already present in the aluminous mineral, about eight per cent. of magnesia and about twelve per cent. of lime, which in most cases are sufficient quantities, the sulfuric acid first carrying in a violent reaction liberating chlorin with the formation of chlorid of aluminium, and producing sulfates of the alkali-metal salts and accidentally some of the alumina. By the following subliming of the chlorid of aluminium with the alkalies, which part of the process is identical with my improved process for "Roasting ores and recovering vapors therefrom," No. 537,941, dated April 23, 1895, the sulfuric acid will be evolved and carried into the said nitrohydrochloric acid to carry in the reaction for the liberation of chlorin for the recovery of the chlorid of aluminium and alkali-metal bases.

The mixing of the above ingredients I preferably carry out within a suitable closed mixer as usually used for such purposes, and I confine the evolved gases within the same to be absorbed by the mass. After the reaction has ceased I mix with the said mass about five per cent. of carbonaceous matter, such as sawdust, or I add some carbon, such as charcoal or coal in form of powder, and treat the said mixture by my above-named improved "Method for rotating ores, &c.," first evaporating the waste nitrohydrochloric acid by moderate heat and collect the same in the absorbing-chamber described in the said application for Letters Patent. After the moisture has been expelled from the mass, the decomposition of the sulfates and chlorids of aluminium and alkali metals takes place through the increased heat for the said roasting and subliming, and said heating I maintain only to such a height so that the impurities do not slag. The chlorid of aluminium is evolved from the mass and carried over with the evolved alkali vapors to be recovered as chlorid of aluminium and sulfates of the alkalies. After the evolving of said vapors ceases I replace the remaining substance, which represents the impurities, by a fresh supply of the said above mass, and so on. The recovered chlorid of aluminium with the accompanying alkali-metal salts are taken from the said absorbing-chambers and freed from the acids in a suitable retort as generally used for such purposes. The said evolved acid vapors I also recover, and the resultant acid will be used over and over again, as above provided for using the acids. With the remaining mass I mix some carbon, about five per cent., and heat the mixture to glow until the said chlorid of aluminium and sulfates of sodium or potassium and other chlorids and sulfates accidentally present are decomposed.

The proportions in the formula above given are variable serviceably within considerable limits without materially affecting the functions of the combination. In fact, any proportion which may be found suitable may be employed.

For the reduction I powder the resultant dry aluminous mass, consisting chiefly of alumina in combination with sodium and potassium oxid, the latter present if the corresponding nitrate had been employed for the production of the said nitric acid within the treatment, and I mix the same with some broken carbon, preferably in size of about ten-mesh screen, and I preferably use hard charcoal for this purpose and in such quantities that the carbon particles may come in contact or nearly so throughout the mass, which represents then the bath. Meanwhile I heat the furnace or retort above described by fire to about a low red heat, and I fill the same to the proper height with already-reduced aluminium and the above-described bath, as shown in the drawings. Then I connect the electrodes with the positive and negative wires and reduce by passing an electric current through the said bath of sufficient potential in order to set the carbon mixed with the said bath in incandescence, and it is a point of careful regulation to maintain only sufficient heat to carry in the reduction since any further expenditure is not only useless, but lessens the output of aluminium, and I preferably, therefore, use a current of about thirty-five to fifty volts and about three thousand five hundred to five thousand amperes. Discharge the reduced metal and charge with more bath and so on continuously.

Having described my invention, what I claim, and desire to secure by Letters Patent, is—

1. As an improvement in the art of manufacturing aluminium, the herein-described process, which consists in purifying the aluminous ores, minerals and compounds and in mixing the same with nitric acid, hydrochloric acid, sulfuric acid, suitable alkali-metal salts such as chlorid of sodium, nitrate of sodium or potassium, suitable alkaline-earth-metal salts such as native sulfate of barium, chlorid of lime and chlorid of magnesia, and suitable carbonaceous matter such as sawdust, and in expelling the waste acids from the mixture, and in subjecting the remaining mass to heat to glow, and in powdering the resultant mass representing then a bath, and in mixing the same with carbon and in subjecting the said bath consisting then chiefly of alumina, alkali-metal oxids, alkaline-earth-metal oxids and carbon to the action of an electric current and the action of external applied heat to the containing vessel composed of a suitable metal such as iron or steel, until reduction takes place, substantially as set forth.

2. As an improvement in the art of manufacturing aluminium, the herein-described method, which consists in treating aluminous ores, minerals and compounds with nitric acid, hydrochloric acid, sulfuric acid, suitable alkali-metal salts such as chlorid of sodium, nitrate of sodium or potassium, suitable alkaline-earth-metal salts such as native sulfate of barium, chlorid of lime and chlorid of magnesia, &c.; and in adding a suitable carbonaceous matter, and in subjecting the resultant mixture to a moderate temperature to expel the waste acids, and in the recovery of the said waste acids, and in subliming the resultant chlorid of aluminium and the bases of the said alkali-metal salts by increasing the temperature, and in recovering the said chlorid of aluminium and said bases of the said alkali-metal salts in the said waste acids, and in expelling the said waste acids from the said recovered chlorid of aluminium and produced sulfates of the alkalies, and in glowing the remaining mass with carbon, and in powdering the resultant mass representing then a bath; and in mixing the said bath with a suitable carbon, and in subjecting the said bath consisting then chiefly of alumina, oxids of the alkali metals and carbon, to the action of an electric current and the action of external applied heat to the containing vessel composed of a suitable metal, such as iron or steel, until reduction takes place, substantially as set forth.

3. As an improvement in the art of manufacturing aluminium, the herein-described process, which consists in mixing aluminous ores, minerals and compounds with nitric acid, hydrochloric acid, sulfuric acid, suitable alkali-metal salts such as chlorid of sodium, nitrate of sodium or potassium, suitable alkaline earths such as lime, magnesia, &c.; and a suitable carbonaceous matter, and in subjecting the resultant mixture to a moderate temperature to expel the waste acids from the mixture, and in subjecting the remaining mass to heat to glow, and in powdering the resultant mass representing then a bath, and in mixing the same with carbon and in subjecting the said bath consisting then chiefly of alumina, alkali-metal oxids, alkaline-earth-metal oxids and carbon, to the action of an electric current and the action of external applied heat to the containing vessel composed of a suitable metal such as iron or steel, until reduction takes place, substantially as set forth.

4. As an improvement in the art of manufacturing aluminium, the herein-described process, which consists in purifying the aluminous ores, minerals and compounds, and in mixing the same with nitric acid, hydrochloric acid, sulfuric acid, suitable alkali-metal salts such as chlorid of sodium, nitrate of sodium or potassium, suitable alkaline earths such as lime, magnesia, &c.; and a suitable carbonaceous matter, and in subjecting the resultant mixture to a moderate temperature to expel the waste acids, and in the recovery of the said waste acids, and in subliming the resultant chlorid of aluminium and the bases of the said alkali-metal salts by increasing the temperature, and in recovering the said chlorid of aluminium and said bases of the said alkali-metal salts in the said waste acids, and in expelling the said waste acids from the said recovered chlorid of aluminium and produced sulfates of the alkalies, and in glowing the remaining mass with carbon, and in powdering the resultant mass representing then a bath; and in mixing the said bath with a suitable carbon, and in subjecting the said bath consisting then chiefly of alumina, oxids of the alkali metals and carbon, to the action of an electric current and the action of external applied heat to the containing vessel composed of a suitable metal, such as iron or steel, until reduction takes place, substantially as set forth.

5. As an improvement in the art of manufacturing aluminium, the herein-described method, which consists in treating aluminous ores, minerals and compounds having alkaline earths in their composition, with nitric acid, hydrochloric acid, suitable alkali-metal salts such as chlorid of sodium, nitrate of sodium or potassium and sulfuric acid, and in mixing with the resultant mass a suitable carbonaceous matter or a suitable carbon, and in subjecting the resultant mixture to a moderate temperature to expel the waste acids, and in subjecting the remaining mass to heat to glow, and in powdering the resultant mass representing then a bath, and in mixing the same with carbon, and in subjecting the said bath consisting then chiefly of alumina, alkali-metal oxids, alkaline-earth-metal oxids and carbon, to the action of an electric current and the action of external applied heat to the containing vessel composed of a suitable metal such as iron or steel until reduction takes place, substantially as set forth.

6. As an improvement in the art of manufacturing aluminium, the herein-described process, which consists in purifying the aluminous ores, minerals and compounds having alkaline earths in their composition, and in treating the same with nitric acid, hydrochloric acid, suitable alkali-metal salts such as chlorid of sodium, nitrate of sodium or potassium and sulfuric acid, and in mixing with the resultant mass a suitable carbonaceous matter or a suitable carbon, and in subjecting the resultant mixture to a moderate temperature to expel the waste acids, and in the recovery of the said waste acids, and in subliming the resultant chlorid of aluminium and the bases of the said alkali-metal salts, and in recovering the said chlorid of aluminium and said bases of the alkali-metal salts in the said waste acids, and in expelling the said waste acids from the recovered chlorid of aluminium and resultant sulfates of the alkalies, and in mixing the remaining mass with a suitable carbonaceous matter, and in subjecting the mixture to a temperature to glow, and in powdering the resultant mass representing then a bath, and in mixing the same with a suitable carbon, and in subjecting the said bath consisting then chiefly of alumina, oxids of the alkali metals and carbon to the action of an electric current, and the action of external applied heat to the containing vessel composed of a suitable metal such as iron or steel, until reduction takes place, substantially as set forth.

7. As an improvement in the art of manufacturing aluminium the herein-described method, which consists in treating aluminous ores, minerals and compounds having alkaline earths, salts of the alkaline-earth metals and salts of the alkali metals in their composition with nitric acid, hydrochloric acid and sulfuric acid, and in mixing with the resultant mass a suitable carbonaceous matter or carbon, and in expelling the waste acids from the mixture, and in subjecting the remaining mass to heat to glow, and in powdering the resultant mass representing then a bath, and in mixing the same with carbon, and in subjecting the said bath consisting then chiefly of alumina, alkali-metal oxids, alkaline-earth-metal oxids and carbon, to the action of an electric current and the action of external applied heat to the containing vessel composed of a suitable metal such as iron or steel until reduction takes place, substantially as set forth.

8. As an improvement in the art of manufacturing aluminium the herein-described method, which consists in treating aluminous ores, minerals and compounds having alkaline earths, salts of the alkaline-earth metals and salts of the alkali metals in their composition with nitric acid, hydrochloric acid and sulfuric acid; and in mixing with the resultant mass a suitable carbonaceous matter or carbon, and in subjecting the resultant mixture to a moderate heat to expel the waste acids, and in the recovery of the said waste acids, and in subliming the resultant chlorid of aluminium and the bases of the said alkali-metal salts, and in recovering the said chlorid of aluminium and the said bases of the alkali-metal salts in the said waste acids; and in subjecting the resultant mass to a moderate temperature to expel the said waste acids, and in mixing the remaining mass with a suitable carbonaceous matter or carbon, and in subjecting the resultant mixture to a temperature to glow, and in powdering the resultant mass representing then a bath, and in mixing the same with a suitable carbon, and in subjecting the said bath consisting then chiefly of alumina, oxids of the alkali metals and carbon to the action of an electric current, and the action of external applied heat to the containing vessel composed of a suitable metal such as iron or steel until reduction takes place, substantially as set forth.

9. As an improvement in the art of manufacturing aluminium the herein-described method, which consists in treating aluminous ores, minerals and compounds with nitric acid, hydrochloric acid, suitable alkaline earths, suitable salts of the alkaline-earth metals, suitable salts of the alkali metals and sulfuric acid, and in mixing with the resultant mass a suitable carbonaceous matter or carbon, and in expelling the waste acids from the mixture, and in subjecting the remaining mass to heat to glow, and in powdering the resultant mass representing then a bath, and in mixing the same with carbon, and in subjecting the said bath consisting then chiefly of alumina, alkali-metal oxids, alkaline-earth-metal oxids and carbon, to the action of an electric current and the action of external applied heat to the containing vessel composed of a suitable metal such as iron or steel until reduction takes place, substantially as set forth.

10. As an improvement in the art of manufacturing aluminium the herein-described process, which consists in treating aluminous ores, minerals and compounds with nitric acid, hydrochloric acid, suitable alkaline earths, suitable salts of the alkaline-earth metals, suitable salts of the alkali metals and sulfuric acid, and in mixing with the resultant mass a suitable carbonaceous matter or carbon, and in subjecting the resultant mixture to a moderate temperature to expel the waste acids, and in the recovery of the said waste acids, and in subliming the resultant chlorid of aluminium and the bases of the said alkali-metal salts, and in recovering the said chlorid of aluminium and the said bases of the alkali-metal salts in the said waste acids, and in subjecting the resultant mass to a moderate temperature to expel the said waste acids, and in mixing the remaining mass with a suitable carbonaceous matter or carbon, and in subjecting the resultant mixture to a temperature to glow, and in powdering the resultant mass representing then a bath, and in mixing the same with a suitable carbon, and in subjecting the said bath consisting then chiefly of alumina, oxids of the alkali metals and carbon to the action of an electric current and the action of external applied heat to the containing vessel composed of a suitable metal such as iron or steel until reduction takes place, substantially as set forth.

HEINRICH F. D. SCHWAHN.

Witnesses:
 HENRY STUBENRAUCH,
 GUS. SCHWAHN.